Patented Dec. 10, 1946

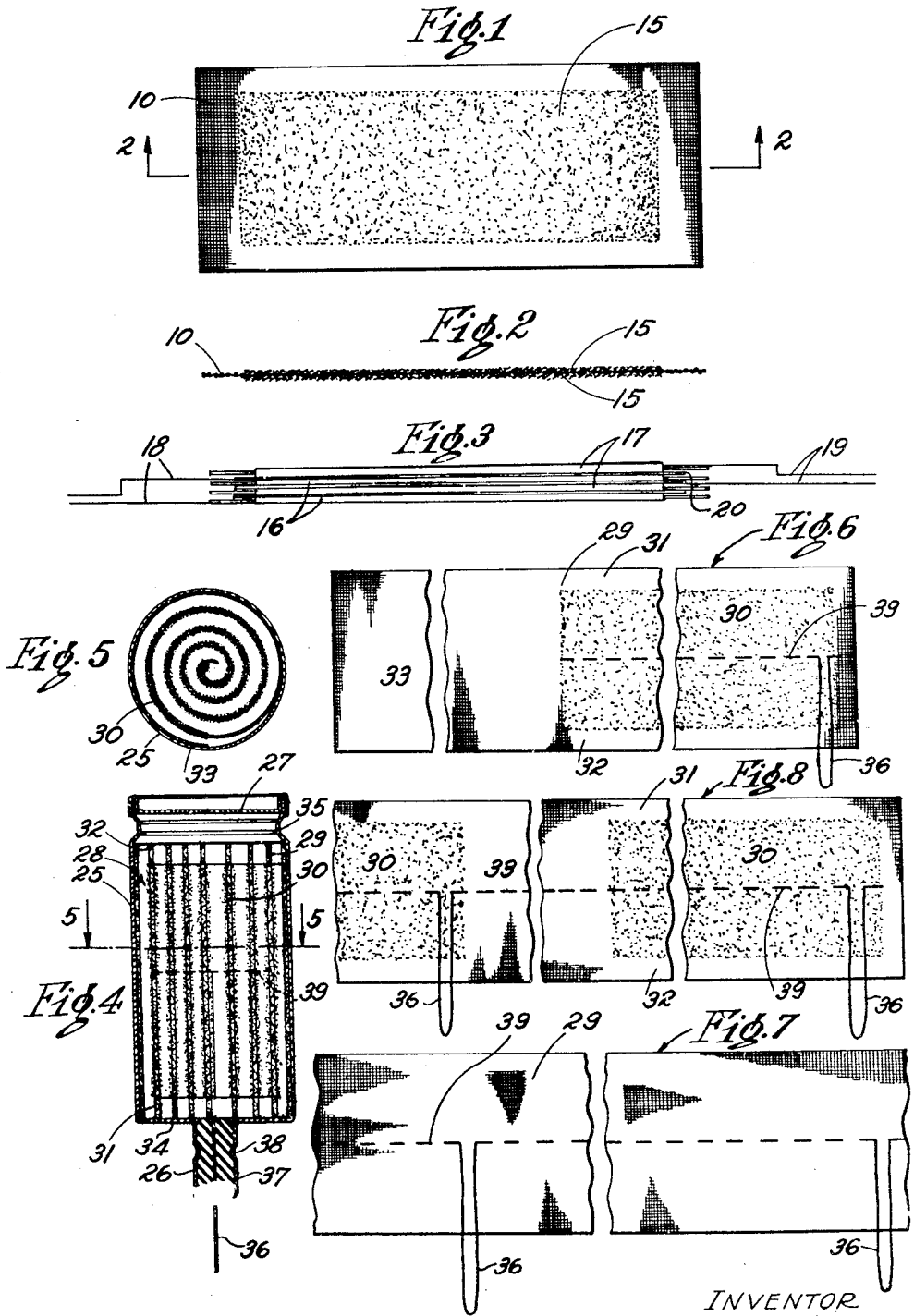

2,412,201

UNITED STATES PATENT OFFICE 2,412,201

METHOD OF MAKING ELECTROLYTIC DEVICES

Joseph B. Brennan, Euclid, Ohio

Original application August 9, 1937, Serial No. 158,105. Divided and this application October 1, 1941, Serial No. 413,146

3 Claims. (Cl. 175—315)

This invention relates to methods of making electrolytic devices and more particularly to methods of making electrodes for electrolytic devices such as electrolytic condensers, rectifiers, lightning arresters and the like. This application is a division of my copending application Serial No. 158,105, filed August 9, 1937, now Patent No. 2,280,789. In this application the invention is described particularly with reference to electrolytic condensers, but it is to be understood that the invention may be applied to various other types of electrolytic devices.

It is among the general objects of my invention to provide an economical and efficient method of making electrodes for electrolytic devices such as electrolytic condensers, and the like, which will operate efficiently over long periods of time with low resistance and power factor losses. It is also among the objects of my invention to provide a method of making electrodes for electrolytic devices which will have an effective area in contact with the electrolyte many times the plane area thereof and which, when provided with dielectric films and incorporated in electrolytic condensers, will have capacities many times greater than capacities of plane surfaced electrodes of similar size. Another object is to provide a method of making an electrode comprising a strip having a porous or permeable surface, the strip being flexible so that it can be bent into various forms.

Briefly, I obtain the advantages noted above and economically produce efficient electrodes for electrolytic devices by spraying molten metal such as finely divided aluminum of high purity upon a base which preferably consists of a thin, flexible strip of porous or woven material. As described in my Patent No. 2,104,018 the sprayed deposit consists of a very large number of minute metallic particles which adhere to the base and cohere to each other to produce a thin porous layer that is conductive throughout substantially its entire area. Such a layer deposited on a base which is also porous or permeable produces an electrode which is porous or reticulated throughout so that in use the surface area of the metallic particles exposed directly to the electrolyte is very large, resulting in a compact electrode which, when provided with a dielectric film, has a high capacity per unit of plane area. Furthermore, because of the very large area of metallic particles in contact with the electrolyte and because of the porous structure of the electrode, the current densities may be kept at a low value, resistance is reduced and long life and efficient operation of electrolytic devices embodying my invention is thus insured.

Various metals may be deposited on suitable bases, depending upon the service for which the electrode is intended. For example, in the production of filmed electrodes for electrolytic condensers, I preferably spray finely divided molten particles of high purity aluminum on strips of flexible porous material. The spraying operation may be carried out with well known apparatus in the manner described in greater detail in my patent aforesaid to produce a thin, porous or permeable deposit of finely divided aluminum particles which adhere to the base material and cohere to each other to produce a layer which is conductive throughout substantially its entire area, and which has a very large effective area. Various porous or woven materials may be used advantageously. For example, I may spray aluminum on a woven screen composed of fine aluminum wires, upon a soft permeable base made of paper such as ordinary filter paper, upon cloth woven of textile materials such as the gauze used in the manufacture of spacers for electrolytic condensers, or upon cloth woven of glass threads or filaments.

The molten metallic particles are preferably sprayed on both sides of the base, a fine spray being employed. Preferably thin layers are deposited in order to save material, it only being necessary to spray a sufficient thickness to insure that the sprayed layers will be conductive throughout substantially their entire areas. In the case of aluminum anodes, for example, excellent results may be obtained by spraying layers about 1 to 3 thousandths of an inch thick. While the sprayed material does have the effect of stiffening the base material to some extent, the completed electrodes retain sufficient flexibility so that they can be readily bent into desired shapes. When such electrodes, suitably provided with dielectric films, are incorporated in electrolytic condensers, capacities as much as ten or more times the capacity of condensers embodying ordinary aluminum electrodes of the same plane area may be obtained. Furthermore, by the use of such electrodes condensers having extremely low resistance and in which the power factor losses are less than 4 per cent may be produced.

In spraying the metal on flexible porous strips of the types mentioned above, I preferably carry out the operation in a continuous manner, thus producing continuous strips of material suitable for use as electrodes. If the electrodes are intended for use as anodes in electrolytic condensers, the sprayed strips may conveniently be formed with a dielectric film by continuously passing them through a suitable film forming bath and applying the necessary voltages to the strips. Thereafter the strips may be cut into pieces of the desired length, bent into the proper shape if necessary, and incorporated in condensers.

Further advantageous features and other objects of my invention will be evident to those skilled in the art from the following description of preferred forms thereof, reference being made to the accompanying drawing in which Figure 1 is a plan view of an electrode made according to my invention; Figure 2 is a section through the electrode of Figure 1 as indicated by the line 2—2; Figure 3 is a view of a paste type electrolytic condenser made according to my invention; Figure 4 is a sectional view of a wet type electrolytic condenser made according to my invention; Figure 5 is a section as indicated by the line 5—5 on Figure 4; and Figures 6, 7 and 8 illustrate different steps in a preferred form of my method.

As illustrated somewhat diagrammatically in Figures 1 and 2, the base or backing material of an electrode made according to my invention preferably comprises a porous flexible strip 10 illustrated herein as being of woven material. Any suitable strands or filaments may be employed in weaving the strip, it only being necessary to select filaments which will not react with or contaminate the electrolyte to be employed in the condenser or other electrolytic device and which will not otherwise adversely affect the operation of the device. In connection with electrolytic condensers, I prefer that the cloth be woven of materials such as purified cotton threads or yarns, spun glass filaments or fine metallic wires, the wires employed being of the same material as the metal to be sprayed thereon. One or more thicknesses of material may be employed depending on the desired thickness of the electrode which is to be produced. When multiple layers of cloth are employed, the sprayed metal bonds the layers together. The spraying of such thickness of metal, particularly when a gauze base is employed, results in an electrode that is sufficiently open mesh and porous to permit light to pass through the electrode layer at a multiplicity of points distributed throughout its area.

The strip 10 is provided with areas of sprayed metal 15 on either side thereof. Preferably the sprayed metal is only 0.001 inch to 0.003 inch in thickness, the thickness of the layers being greatly exaggerated throughout the drawing. The sprayed areas may be stopped short of the edges of the strip, particularly when a non-conductive material such as cotton cloth or glass cloth is employed, so as to provide insulating edges for the electrodes. The layers 15 as previously noted comprise a very large number of finely divided cohering metallic particles, the layers being conductive throughout substantially their entire area.

If the electrode is intended for use as an anode in an electrolytic condenser, the layers 15 are formed of aluminum or other film forming metal, and after the spraying operation has been completed the electrodes may be provided with dielectric films by subjecting them to electrolysis in a film forming bath such as a solution of borax and boric acid. The composition of the bath, the temperature of the bath and the voltage applied to the electrodes all may be controlled in ways well known to those skilled in the art and depending upon the particular service for which the electrode is intended. Various methods of forming dielectric films are well known in the art. Such methods, per se, form no part of the present invention and therefore will not be discussed further herein. For the purposes of this application, it is sufficient to state that the dielectric film conforms substantially to the contour of the many minute particles and thus the area of the film is greatly increased as compared to the plane area of the electrode.

When such an electrode is incorporated in an electrolytic cell, the electrolyte permeates the sprayed metallic layers as well as the porous base material. Thus the effective area of the electrode will be many times the plane area thereof. It will be evident that condensers embodying such electrodes will have very large capacities per unit of plane area, since the capacity of a condenser is a function of the area of the plates and in my device the area of the plate consists in the sum of the exposed areas of all of the many minute cohering metallic particles.

Electrodes made according to my invention may be incorporated in various types of electrolytic devices. In Figure 3, for example, I have illustrated a paste type condenser embodying my electrodes. As illustrated in the drawings, such a condenser, when intended for use in direct current circuits, may comprise a plurality of anodes 16 which may be made in the manner described above, and a plurality of cathodes 17. The cathodes may be similar to the anode plates except that in the case of condensers intended for direct current service, the cathodes need not be provided with dielectric films. Or, if desired, the cathodes may be made of ordinary metallic sheets or may be made of sprayed metals which will not become filmed such as copper. In condensers intended for alternating current service, both sets of electrodes are preferably provided with dielectric films. The anodes and cathodes are provided with suitable terminals such as strips of metallic foil 18 and 19, respectively, and the electrodes may be prevented from coming in contact with each other by suitable porous separators such as the paper strips 20. The whole condenser assembly may be suitably impregnated with a pasty or viscous electrolyte such as that described in my Patent No. 2,095,966, issued October 19, 1937, and may be enclosed in a suitable container or casing in a manner known to those skilled in the art.

As illustrated in Figures 4 and 5, electrodes made according to my invention may be conveniently incorporated in electrolytic condensers of the wet or liquid type. Such a condenser may comprise a can 25 which serves as the cathode of the condenser and also as a container for the electrolyte. The can has a depending hollow neck portion 26 and is provided with a closure member 27. The electrode 28 which constitutes the anode of the condenser may be suitably supported within the container and is immersed in the electrolyte.

Preferably the anode 28 is constructed as illustrated in Figure 6 of the drawing in such a manner as to eliminate the need for any mechanical support for the anode within the container and also to eliminate the necessity for providing a separate insulating spacer between the anode and the container. Thus, the anode 28 preferably comprises a backing of woven non-conductive material 29 such as cotton or glass cloth having sprayed areas 30 on either side thereof. The sprayed areas are spaced from the top and bottom edges of the strip 29 leaving unsprayed non-conductive areas 31 and 32, and there is a considerably unsprayed area 33 at one end of the electrode. This electrode can very readily be incorporated in a condenser of the type illustrated in Figures 4 and 5 by merely coiling the flexible electrode into the form of a spiral with the unsprayed portion 33 forming the outer end of the spiral. The portion 33 is of sufficient length to extend at least once around the spiral electrode to thus provide an insulating spacer integral with the electrode and surrounding the sprayed areas 30. The spiral electrode is inserted into the can or container with the unsprayed area 33 in engagement with the inside of the can and the unsprayed lower edge portion 31 in engagement with the bottom portion 34 of the can, the upper unsprayed edge 32 holding the electrode against upward movement by engaging, for example, the inwardly deformed portion 35 of the container.

By this construction, the metallic sprayed areas of the electrode are securely and definitely spaced away from the container and closure member by the non-conductive edge portions of the backing member 29 and the entire electrode is mechanically supported within the container so that no further mechanical support is necessary. Thus the usual rod or riser may be eliminated and the electrical contact between an exterior circuit and the electrode may be made by a lead-in, shown herein as a wire 36, which extends downwardly through the neck portion 26. Preferably the lead-in 36 extends through a rubber gromet member 37, and the neck portion is deformed inwardly as at 38 to compress the rubber gromet member and seal the neck portion and lead-in wire 36 against leakage of fluid.

To provide an effective and economical connection between the lead-in 36 and the sprayed areas of the electrode, the lead-in is preferably extended along the backing material as indicated at 39 in Figure 6. The wire or other conductor may be secured to the backing material by stitching or may be merely laid along the strip before the spraying operation takes place. By this sequence of operation, effective contact between the conductor and the sprayed material is assured, and the sprayed material secures the conductor to the base strip. Electrodes of this type, that is with an additional conducting member incorporated therein, may obviously be advantageously used in connection with the dry type of condenser hereofore described. Such electrodes have extremely low resistance because of the fact that the conducting members extend throughout the length of the electrode.

In Figures 7 and 8, I have illustrated steps of a method which may be conveniently employed in the manufacture of electrodes of the general type illustrated in Figure 6. As shown in Figure 7, the first step preferably is to provide the strip of woven backing material 29 with a conducting member such as the stitched wires 39 extending throughout the length of the strip which may be many feet long. At regular intervals throughout the strip, the wire or wires 39 are pulled out to form the loops 36 which ultimately constitute the terminal members for the electrode. The spacing of the loops 36 is determined by the size of the electrodes to be produced. The strip 29 with the stitching 39 therein is then provided with the sprayed areas 30 as indicated in Figure 8. The spraying operation may be carried out continuously, the strip being sprayed simultaneously from both sides. Metallic shield members may be employed to prevent the molten metal from adhering to the portions 31, 32 and 33, or, if desired, to cause the sprayed material to be deposited in any desired patterns.

The spraying operation thus produces a strip of backing material having spaced sprayed areas thereon, the entire strip being conductive throughout its length by reason of the conductors 39. The conductive strip may then be passed through a forming bath in a continuous manner so that as each portion of the strip leaves the bath it will be properly formed with a dielectric film. Thereafter the strip may be cut in the spaces between the successive sprayed areas and the wire stitching ripped out from such spaces to provide the electrode illustrated in Figure 6. This electrode is then bent into a spiral or other convenient shape and may be incorporated into a condenser as described above.

Various changes and modifications in my invention will be evident to those skilled in the art. Obviously my invention may be applied to various types of electrolytic devices and various changes can be made as to both the articles and methods disclosed herein without departing from the spirit and scope of my invention. It is therefore to be understood that my patent is not limited to the preferred forms of my invention disclosed herein or in any manner other than by the scope of the appended claims when given the range of equivalents to which my patent may be entitled.

I claim:

1. A method of making flexible sheet electrodes for electrolytic condensers which comprises spraying an open mesh cloth base with finely divided particles of molten film forming metal and carrying out the spraying operation in such manner as to produce a conductive layer of cohering metal particles adhering to said base, the layer being of such thinness and the electrode being sufficiently open mesh and porous to permit light to pass through the electrode layer at a multiplicity of distributed points throughout its area.

2. A method of making electrodes for electrolytic condensers which comprises stitching a wire along a strip of backing material, pulling out loops of said wire at intervals along said strip, said loops extending beyond an edge of said strip, spray depositing finely divided particles of molten metal on said strip and the portion of said wire overlying said strip and cutting said strip into lengths suitable to form electrodes, each such length having associated therewith a portion of said wire projecting beyond the edge of said strip to constitute a terminal for such length.

3. A method of making electrodes for electrolytic condensers which comprises positioning a conductor along a strip of backing material, extending portions of said conductor beyond an edge of said strip at intervals along said strip, spray depositing finely divided particles of molten metal on said strip and the portion of said conductor overlying said strip and cutting said strip into lengths suitable to form electrodes, each such length having associated therewith a portion of said conductor projecting beyond the edge of said strip to constitute a terminal for such lengths.

JOSEPH B. BRENNAN.